(12) United States Patent
Naoe

(10) Patent No.: US 7,297,363 B2
(45) Date of Patent: Nov. 20, 2007

(54) METHOD FOR PRODUCING MAGNETIC RECORDING MEDIUM

(75) Inventor: Koji Naoe, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 137 days.

(21) Appl. No.: 10/601,593

(22) Filed: Jun. 24, 2003

(65) Prior Publication Data
US 2004/0013843 A1    Jan. 22, 2004

(30) Foreign Application Priority Data

Jun. 25, 2002 (JP) ............................ 2002-184193
Jun. 25, 2002 (JP) ............................ 2002-184194

(51) Int. Cl.
*B05D 5/12* (2006.01)
(52) U.S. Cl. .................... 427/129; 427/209; 427/401.1
(58) Field of Classification Search ................ 427/128, 427/129, 209, 417.1
See application file for complete search history.

(56) References Cited

U.S. PATENT DOCUMENTS

| | | | | |
|---|---|---|---|---|
| 4,135,016 A | * | 1/1979 | Ogawa et al. | 428/843.6 |
| 4,448,848 A | * | 5/1984 | Okita et al. | 427/447 |
| 4,482,578 A | * | 11/1984 | Akashi et al. | 427/502 |
| 5,576,075 A | * | 11/1996 | Kawasaki et al. | 427/565 |
| 5,858,325 A | * | 1/1999 | Hall et al. | 423/625 |
| 2001/0044031 A1 | * | 11/2001 | Ikeuchi et al. | 428/411.1 |
| 2003/0054201 A1 | * | 3/2003 | Ohno et al. | 428/694 R |

FOREIGN PATENT DOCUMENTS

| JP | 61-66224 | | 4/1986 |
|---|---|---|---|
| JP | 61-66227 | | 4/1986 |
| JP | 403081373 A | * | 4/1991 |
| JP | 4-47526 | | 2/1992 |
| JP | 7-153074 | | 6/1995 |

OTHER PUBLICATIONS

Communication from Foreign Patent Office dated Jun. 16, 2006.

* cited by examiner

*Primary Examiner*—Alain L. Bashore
(74) *Attorney, Agent, or Firm*—Sughrue Mion, PLLC

(57) ABSTRACT

In the method for producing a magnetic recording medium having a nonmagnetic substrate coated with a magnetic coating material containing a ferromagnetic powder and a binder, the magnetic coating material contains a liquid A constituted by the ferromagnetic powder and a solvent, and a solution B of the binder, and the liquid A and the solution B are mixed together by applying an ultrasonic wave thereto, and are thereafter subjected to dispersion processing. Thereby, coagulated particles of the ferromagnetic powder can be dispersed and the coagulation of the ferromagnetic powder can be prevented, thus making it possible to obtain a liquid of ferromagnetic powder with uniform adsorption of the binder. As a result, a magnetic coating material suitable for a low-noise high-density coating-type magnetic recording medium is obtained.

8 Claims, 2 Drawing Sheets

METHOD FOR PRODUCING MAGNETIC RECORDING MEDIUM

BACKGROUND OF THE INVENTION

1. Field of the Invention

The present invention relates to a method for producing a magnetic recording medium, and particularly to a method for producing a low-noise and high-density coating-type magnetic recording medium.

2. Description of the Related Art

For increasing the density of the magnetic recording medium, the method of increasing the tape length (reducing the tape thickness) to increase the volume recording density, and the method of reducing the track width to increase the area recording density have been generally used in many systems as for tape-shaped media.

Consequently, the reduced tape thickness has caused the problem of insufficient edge strength of tapes, thus bringing about a situation in which substrates of materials that have higher strength and are more expensive than conventional products must be used. Also, a servo technique has been developed for accommodating the recently adopted method of reducing the track width, but this technique is difficult to apply particularly in a linear-type system, and the cost of development is considerably be increased.

Methods other than those described above include the method of increasing the linear recording density as a method for increasing the density, but this method has been avoided because of the considerable reduction in C/N (carrier output/noise ratio) associated with short-wave recording.

Recently, an increasing number of systems have adopted high-sensitivity MR heads as playback heads as a method for increasing the density. In this case, reduction of the medium noise and extreme reduction in thickness of the magnetic layer are required for the magnetic recording medium. It can be considered that a finely granulated and uniformly distributed magnetic material is used, and the magnetic material is uniformly dispersed in preparation of a liquid as the method for reducing the medium noise.

In the conventional liquid preparation method, however, the initial contact of the magnetic material with a binder is achieved by a kneader or the like. In this case, since the coagulated magnetic material powder and the solution containing a high concentration of binder are mixed with a high shear force applied thereto, there arise problems such that the wettability of the magnetic material is reduced and hence the dispersibility of the magnetic material is compromised, and the coagulation of the magnetic material formed by kneading cannot be dispersed after it is dispersed, if a magnetic material of fine particles is used. Also, there is a problem that the coagulation of the magnetic material causes not only a noise source but also defects such as seams in coating of an extremely thin magnetic layer.

SUMMARY OF THE INVENTION

The object of the present invention is to solve the above problems of the prior art and provide a low-noise high-density coating-type magnetic recording medium.

In order to attain the above-described object, the present invention is directed to a method for producing a magnetic recording medium having a nonmagnetic substrate coated with a magnetic coating material containing a ferromagnetic powder and a binder, wherein: the magnetic coating material contains a liquid A constituted by the ferromagnetic powder and a solvent, and a solution B of the binder; and the liquid A and the solution B are mixed together by applying an ultrasonic wave thereto, and are thereafter subjected to dispersion processing.

According to the present invention, since the liquid A constituted by a ferromagnetic powder and a solvent can be mixed with the solution B of binder by applying the ultrasonic wave thereto, coagulated particles of the ferromagnetic powder can be dispersed and the coagulation of the ferromagnetic powder can be prevented, thus making it possible to obtain a liquid of ferromagnetic powder with uniform adsorption of the binder. As a result, a magnetic coating material suitable for a low-noise high-density coating-type magnetic recording medium is obtained.

That is, as the particle size of the magnetic material decreases, the surface area of the magnetic material increases. Consequently, the ferromagnetic powder more likely coagulates when the raw material is prepared. The coagulated magnetic material has air trapped therein, but it is difficult to remove the air instantaneously when it initially contacts the binder solution because the magnetic material has a large surface area, and thus the surface of the magnetic material is not sufficiently wetted.

Generally, there is the method in which by granulation such as compaction, deaeration in the powder is promoted to improve the wettability at the time of contact with the solution, but the method has a disadvantage that compaction with a fine particle magnetic material causes coagulation that is difficult to dispersed in the subsequent processing of dispersion of the magnetic coating material.

According to the method for preparation of the magnetic coating material of the present invention, both the dispersing of coagulation of the ferromagnetic powder and the uniform mixing of the ferromagnetic powder and the binder can be performed at a time by cavitation of the ultrasonic wave, thus making it possible to create a state in which the size of secondary coagulation is reduced, and the binder is uniformly absorbed on the surface of the magnetic material. As a result, a magnetic coating material such that the amount of coagulated mass occurring after dispersion processing is not significant, and no magnetic materials are bound together magnetically can be prepared.

In the present invention, it is preferable that the ultrasonic wave is applied within one second after the liquid A and the solution B are mixed together. If the ultrasonic wave is applied within a predetermined amount of time after the liquid A and the solution B are mixed together in this way, the above effect can be achieved more efficiently.

Furthermore, it is preferable that the time until the ultrasonic wave is applied after the liquid A and the solution B are mixed together is within 5 seconds at the maximum. If a larger amount of time passes after the liquid A and the solution B are mixed together, a binder may be adsorbed on the surface of the coagulated ferromagnetic powder, and this situation should be prevented.

Also, in the present invention, it is preferable that the liquid A is subjected to dispersion processing by applying an ultrasonic wave thereto before the liquid A and the solution B are mixed together. If the liquid A is subjected to dispersion processing before the liquid A and the solution B are mixed together in this way, the effect of the present invention can be exhibited more reliably.

Also, in the present invention, it is preferable that the mixing of the liquid A and the solution B by application of the ultrasonic wave is carried out by a flow-type ultrasonic dispersion apparatus. This is because, if the flow-type ultrasonic dispersion apparatus is used in this way, the effect of the present invention can be achieved more reliably.

The present invention is also directed to a method for producing a magnetic recording medium having a nonmagnetic substrate coated with a magnetic coating material containing a ferromagnetic powder and a binder, wherein: the magnetic coating material contains a liquid A constituted by the ferromagnetic powder and a solvent, and a solution B of the binder; and the liquid A is subjected to dispersion processing by applying an ultrasonic wave thereto, and thereafter the liquid A and the solution B are mixed together.

According to the present invention, since the liquid A constituted by a ferromagnetic powder and a solvent is subjected to dispersion processing by applying an ultrasonic wave thereto, and is thereafter mixed with the solution B, coagulated particles of the ferromagnetic powder can be dispersed, and coagulation of the ferromagnetic powder can be prevented, thus making it possible to obtain a liquid in which a binder is uniformly adsorbed. Consequently, a magnetic coating material suitable for a low-noise high-density coating-type magnetic recording medium can be obtained.

According to the method for preparation of a magnetic coating material of the present invention, ultrasonic dispersion processing is carried out with the ferromagnetic powder immersed in the solvent, whereby both the deaeration of the coagulated magnetic material and dispersing of the coagulated magnetic material by cavitation of the ultrasonic wave can be performed at a time, thus making it possible to provide a liquid condition such that the size of secondary coagulation is small, and the surface of the magnetic material is covered with the solvent to improve the wettability.

By mixing the liquid A in this condition with the solution B, the initial contact between the magnetic material and the binder can be uniformalized. As a result, a magnetic coating material in which the amount of coagulated mass is insignificant and magnetic materials are not magnetically bound together can be prepared after dispersion processing.

In the present invention, the ferromagnetic powder can be a needle particle with a major axis length of 10 to 100 nm. Alternatively, the ferromagnetic powder can be a plate particle with a plate diameter of 10 to 50 nm. If the present invention is applied to a ferromagnetic powder having such a form, a magnetic coating material suitable for a low-noise high-density coating-type magnetic recording medium can be obtained.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
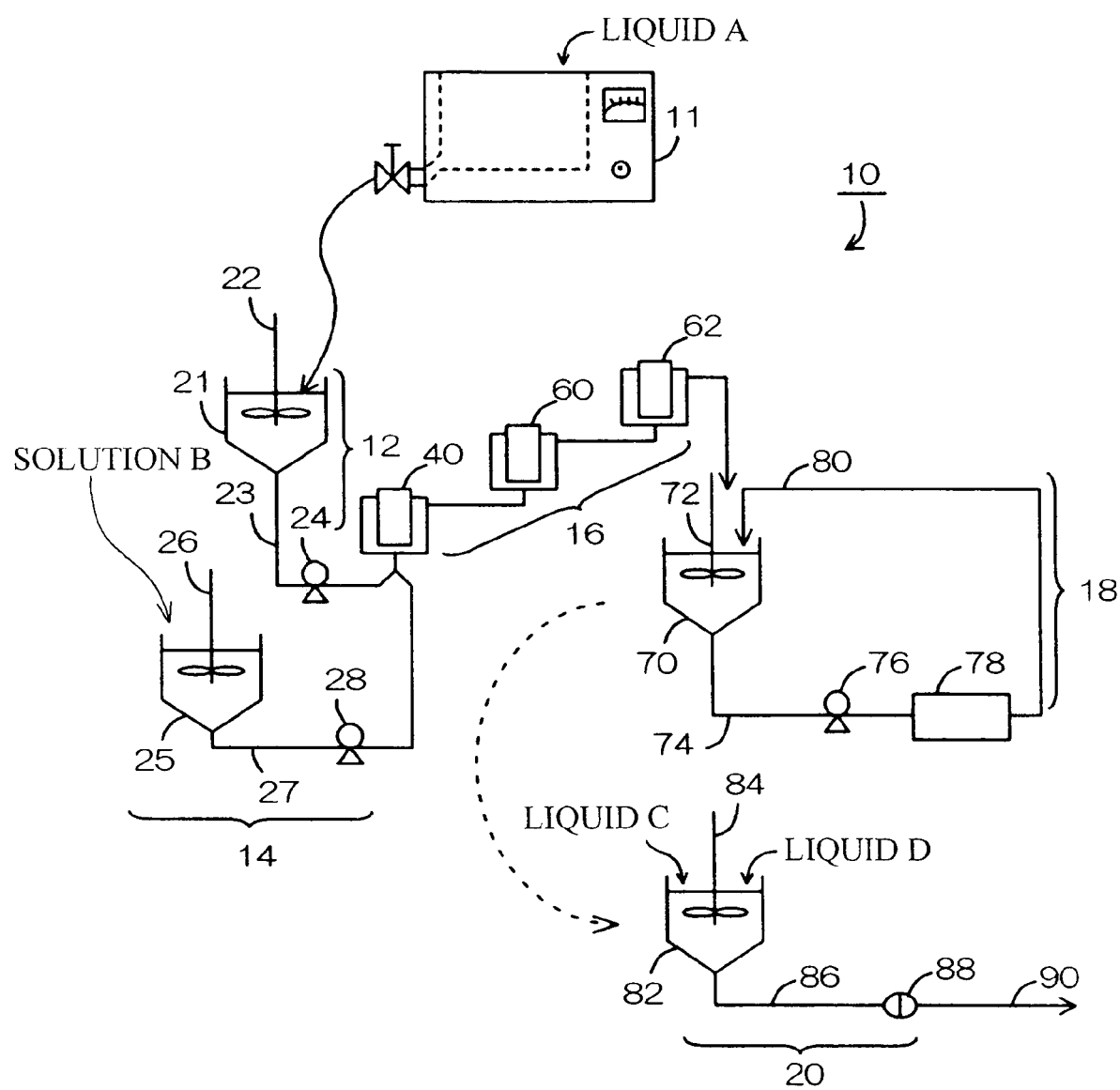
FIG. 1 is an overall block diagram of a production apparatus for a magnetic coating material for use according to an embodiment of the present invention.
Figure 2:
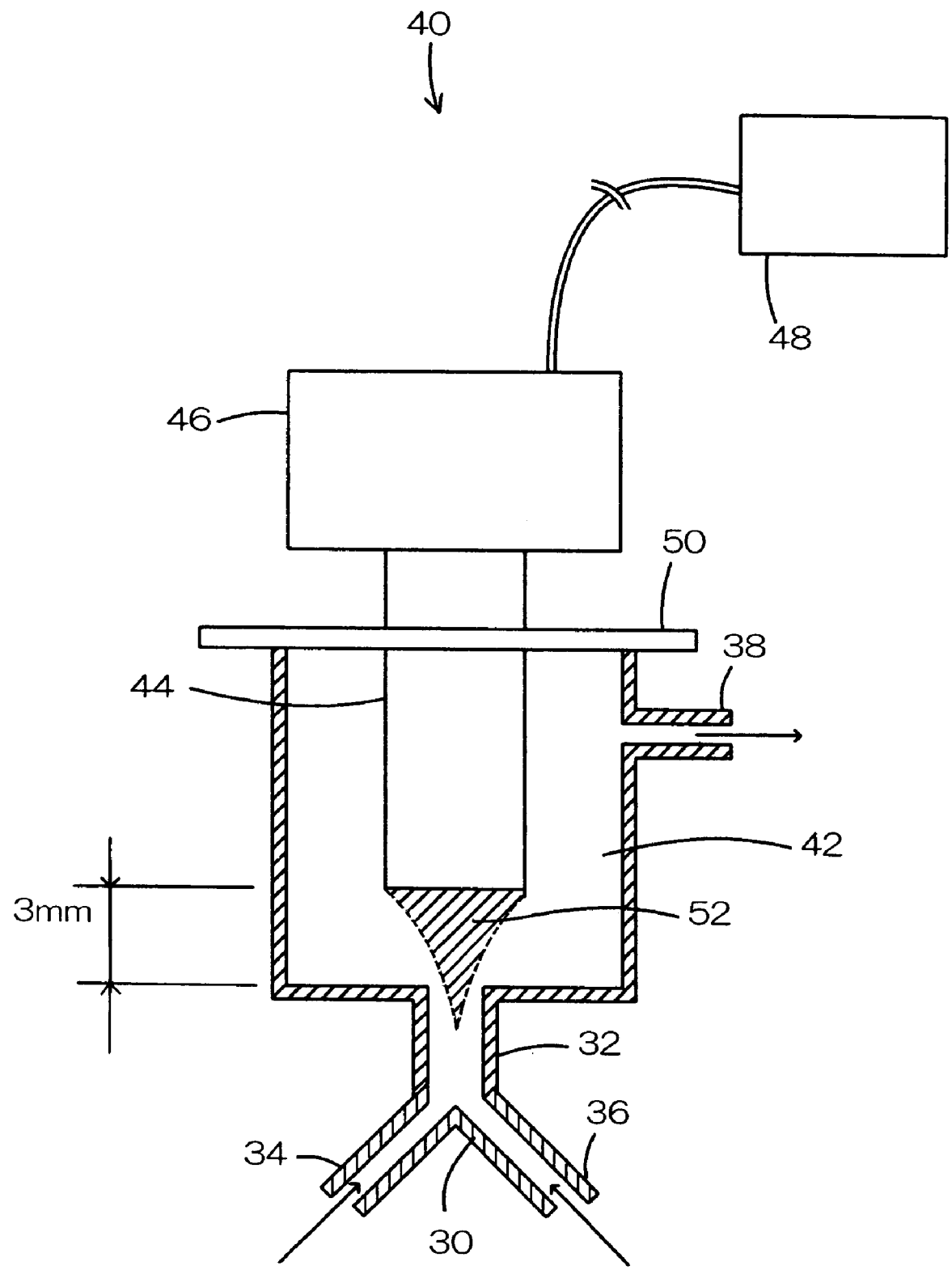
FIG. 2 is a detailed sectional view of an ultrasonic dispersion apparatus for use in an ultrasonic dispersion system.

A preferred embodiment of a production apparatus 10 for a magnetic coating material for use in a method for producing a magnetic recording medium according to the present invention will be described below based on the accompanying drawings. FIG. 1 is an overall block diagram of the production apparatus 10 for the magnetic coating material, and FIG. 2 is a detailed sectional view of an ultrasonic dispersion apparatus 40 for use in an ultrasonic dispersion system 16.

The production apparatus 10 for the magnetic coating material is constituted by an ultrasonic dispersion apparatus 11 for liquid A, a liquid A supplying system 12, a solution B supplying system 14, the ultrasonic dispersion system 16, a sand mill dispersion system 18 and a magnetic coating solution preparing system 20 in this order from the upstream. Furthermore, the liquid A supplying system 12 and the solution B supplying system 14 are placed side by side, and are arranged so that they join into one just before the ultrasonic dispersion system 16.

The ultrasonic dispersion apparatus 11 for liquid A is an apparatus for dispersing the liquid A constituted by a ferromagnetic powder and a solvent by applying an ultrasonic wave thereto before the liquid A and the solution B are mixed together, and may have any of a batch-type processing form and a flow-type processing form. In other words, the apparatus may have any form as long as the liquid concentration, and the frequency, the irradiation area, the number of circulations and the like in ultrasonic dispersion can be set so that cavities (voids) generated in ultrasonic dispersion processing can be assigned in larger quantity and more uniformly to the ferromagnetic powder immersed in the solvent. The ultrasonic dispersion apparatus 11 for liquid A shown in the drawing has a batch-type processing form.

In the case where the ultrasonic dispersion apparatus 11 for liquid A has a batch-type processing form, a frequency of 15 to 1000 kHz can suitably be employed as an ultrasonic frequency. A high frequency is preferable in terms of the number of generated cavities, while a low frequency is preferable in terms of explosive power of generated cavities. In this respect, by using ultrasonic dispersion processing of different frequencies in combination, the coagulated magnetic material can be dispersed more effectively.

If ultrasonic dispersion processing is carried out with a single frequency, the magnetic material can be dispersed by spending a predetermined amount of time (power consumption) at a frequency of 20 to 40 kHz. If the frequency of 20 kHz is compared with the frequency of 40 kHz, the frequency of 40 kHz is more preferable in that the irradiation area is more likely increased, and a larger number of cavities in the liquid are generated and fractured. For the batch-type ultrasonic dispersion apparatus with the frequency of 40 kHz, a various kinds of commercially available ultrasonic cleaners and the like may be used. The manufacturer and the like are not specifically limited.

When ultrasonic dispersion processing is carried out with the batch-type processing form, it is preferable that the unprocessed liquid A is put in a closed container made of glass, plastic or the like having a diameter smaller than the ultrasonic irradiation area, and the container is placed on an ultrasonic irradiation part. Also, if the unprocessed liquid A is put in a container having a diameter larger than the ultrasonic irradiation area, the liquid is more preferably stirred by a stirrer.

In the case where the ultrasonic dispersion apparatus 11 for liquid A has a flow-type processing form, the frequency of the commercially available ultrasonic dispersion apparatus for flow processing is generally around 20 kHz. Hence, it is preferable that the number of circulations of the liquid A is secured, and thereby the number of generated and fractured cavities in the liquid is secured to promote the dispersing of the coagulated magnetic material. Also, the configuration may be employed such that a plurality of ultrasonic dispersion apparatuses 11 for liquid A are arranged in series. Also, the processing is preferably carried out at a higher flow rate as a measure against settlement of the magnetic material.

For this type of ultrasonic dispersion apparatus, for example, a flow-type ultrasonic dispersion apparatus (trade name: US-1200TCVP) manufactured by Nippon Seiki Co., Ltd. may be used. For the specifications of this apparatus, the frequency is 20 kHz, the MAX amplitude is 30 μm, the rated output is 1200 W, the space between the irradiation part and a holder is 3 mm, and so on. This ultrasonic dispersion apparatus has an ultrasonic irradiation zone having a circular shape with the diameter of 50 mm, which is preferable in that a larger irradiation area can be provided.

The liquid A supplying system 12 for supplying the liquid A and the solution B supplying system 14 for supplying the solution B are each constituted by a liquid tank, a liquid supplying device and the like. Specifically, the liquid A supplying system 12 is constituted by a liquid tank 21, a stirrer 22 with its leading end placed in the liquid tank 21, and a liquid supplying pipe 23 from the liquid tank 21 and a liquid supplying pump 24. Similarly, the solution B supplying system 14 is constituted by a liquid tank 25, a stirrer 26 with its leading end placed in the liquid tank 25, a liquid supplying pipe 27 from the liquid tank 25 and a liquid supplying pump 28.

For various kinds of constituent members for use in the liquid A supplying system 12 and the solution B supplying system 14 described above, a various kinds of well known members may be used. However, materials causing no contamination and corrosion are preferably employed in consideration of the nature specific to the magnetic coating material for the magnetic recording medium.

In the ultrasonic dispersion system 16, three flow-type ultrasonic dispersion apparatuses 40, 60 and 62 are placed in series. For these three apparatuses, apparatuses of the same specifications are used. These ultrasonic dispersion apparatuses 40, 60 and 62 each have a configuration such that a liquid is supplied from the bottom face of the apparatus, and the liquid is discharged from the side face of the apparatus. By placing three ultrasonic dispersion apparatuses 40, 60 and 62 in series in this way, coagulated particles of the ferromagnetic particle can reliably be dispersed, and the ferromagnetic powder and the binder can be mixed uniformly.

In FIG. 2, a liquid tank 42 of the ultrasonic dispersion apparatus 40 is a cylindrical container, and a straight part (liquid supplying part) 32 of an inverted Y type pipe 30 is connected to the lower end of the cylindrical container. A pipe 38 (liquid discharging part) is connected to the upper part of the side face at one point. The inverted Y type pipe 30 has its leading end bifurcated, and a pipe 34 for the liquid A and a pipe 36 for the solution B joint into the straight part 32.

By providing such the inverted Y type pipe structure, the liquid A and the solution B flow into the liquid tank 42 of the ultrasonic dispersion apparatus 40 to be exposed to an ultrasonic wave within a predetermined amount of time after they are mixed together. Also, by providing this inverted T type pipe structure, the liquid A and the solution B flow into the liquid tank 42 of the ultrasonic dispersion apparatus 40 to be exposed to an ultrasonic wave after a predetermined amount of time passes after they are mixed together. Thus, as long as the same effect can be exhibited, a same function can be obtained even if an inverted T type pipe or lateral T type pipe is used in place of the inverted Y type pipe 30.

The upper end of the liquid tank 42 of the ultrasonic dispersion apparatus 40 is blocked by a flange 50 of an oscillator 44 described later to form a closed container. The cylindrical oscillator 44 is placed in the liquid tank 42 so that an ultrasonic wave can be applied to a liquid passing through the inside of the liquid tank 42. Furthermore, the flange 50 is combined with the oscillator 44 as one united body.

A converter 46 is fixed to the upper end of the oscillator 44, and electricity is supplied to the converter 46 from a power supply 48. Hence, if the ultrasonic dispersion apparatus 40 is activated, ultrasonic vibrations are promoted by the converter 46, and an ultrasonic wave is applied to the inside of the liquid tank 42 by the oscillator 44.

In the ultrasonic dispersion apparatus 40 of this structure, the space between the upper end of the oscillator 44 and the bottom face of the liquid tank 42 is 3 mm. In the ultrasonic dispersion apparatus 40 of this structure, the area where an ultrasonic wave is effectively applied is a nearly conic zone 52 (hatched area in FIG. 2) below the lower end of the oscillator 44, and other zones are much inferior to the zone 52 in the effect of the ultrasonic wave.

As described previously, the ultrasonic dispersion apparatuses 60 and 62 are placed one after another in the downstream of the ultrasonic dispersion apparatus 40. The ultrasonic dispersion apparatuses 60 and 62 each have the same structure as that of the ultrasonic dispersion apparatus 40 as described previously, and therefore the description thereof is not presented. However, they differ from the ultrasonic dispersion apparatus 40 in that the pipes connected to the ultrasonic dispersion apparatuses 60 and 62 on the upstream side are straight pipes.

For the flow-type ultrasonic dispersion apparatuses 40, 60 and 62 described above, for example, Flow-type Ultrasonic Dispersion Apparatus (trade name: US-1200TCVP) manufactured by Nihon Seiki Co., Ltd. can be used. The specifications of this apparatus are not described here because they have been described previously.

Also, the inner diameters on inlet and outlet sides of the ultrasonic dispersion apparatuses 40, 60 and 62 are each 14 mm, and the pipe volume of the straight part of the inverted Y type pipe 30 (extending from the mixing part of the liquid A and the solution B to the inlet of the liquid tank 42) is 3 $cm^3$.

In FIG. 1, the sand mill dispersion system 18 placed in the downstream of the ultrasonic dispersion system 16 is constituted by a liquid tank 70, a stirrer 72 with its leading end placed in the liquid tank 70, a liquid supplying pipe 74 from the liquid tank 70 and a liquid supplying pump 76, a sand mill dispersion apparatus 78, and a return pipe 80 from the sand mill dispersion apparatus 78 to the liquid tank 70.

In this sand mill dispersion system 18, a liquid flowing from the ultrasonic dispersion system 16 is repeatedly circulated by the sand mill dispersion apparatus 78, and a part thereof is supplied to the magnetic coating solution preparing system 20 in the downstream.

This sand mill dispersion system 18 is intended for further dispersing the ferromagnetic powder of the mixture of the liquid A and the solution B, and for various kinds of constituent members for use in the system, various kinds of well known members may be used. However, materials causing no contamination and corrosion are preferably employed in consideration of the nature specific to the magnetic coating material for the magnetic recording medium.

The magnetic coating solution preparing system 20 placed in the downstream of the sand mill dispersion system 18 is constituted by a liquid tank 82, a stirrer 84 with its leading end placed in the liquid tank 82, a liquid supplying pipe 86 from the liquid tank 82, a filter 88, and a pipe 90 from the filter 88. Also, in the liquid tank 82, a liquid C constituted by a lubricant and a solvent, and a liquid D being an additive solution (constituted by carbon black and an abrasive) are newly added.

In the magnetic coating solution preparing system 20, the magnetic coating material is finally prepared, and is passed through the filter 88, whereby contaminants are removed, the magnetic coating material is supplied for a coating step.

The production of the magnetic coating material using the production apparatus 10 for the magnetic coating material will now be described. For the ferromagnetic powder for use in the present invention, various kinds of materials may be used, but if the ferromagnetic powder is a hexagonal ferrite, a material with the plate diameter of preferably 10 to 50 nm, more preferably 10 to 35 nm, and the plate ratio of 2 or greater may be used, and if the ferromagnetic powder is a ferromagnetic metal powder, a material with the major axis length of preferably 10 to 100 nm, more preferably 10 to 60 nm, and the axis ratio of 2 or greater may be used. For the particle size of this ferromagnetic powder, a material with the average primary particle volume of 10,000 $nm^3$ or smaller may suitably be used.

In the liquid A, the solvent in which the ferromagnetic powder is immersed is preferably a solution containing a cyclohexanone. The content of cyclohexanone is preferably 30 to 100% by weight of the total amount of solvent. For the solution other than cyclohexanone, methyl ethyl ketone, toluene, butyl acetate or the like is preferably used.

The liquid concentration of the liquid A is preferably 5 to 80% by weight, more preferably 10 to 50% by weight, further preferably 25 to 50% by weight. The upper limit of the liquid concentration is defined by permeability, and the lower limit of the liquid concentration is defined by the effect of ultrasonic dispersion.

The liquid A subjected to ultrasonic dispersion processing by the ultrasonic dispersion apparatus 11 for liquid A is put in the liquid tank 21 of the liquid A supplying system 12, and is stirred by the stirrer 22.

In the solution B supplying system 14 shown in FIG. 1, the concentration of solution B of binder is preferably set so that it has a liquid viscosity of 10 Pa·s (100P) or lower, more preferably 1 Pa·s (10P) or lower, most preferably 0.1 Pa·s (1P) or lower by vismetron.

The ratio of the binder of the magnetic material in the solution B when the liquid A is mixed with the solution B is preferably 0.5 to 30 parts by weight, more preferably 2 to 15 parts by weight of binder relative to 100 parts by weight of magnetic material. Also, in consideration of assurance of film strength, assurance of dispersion and so on, it is preferable that a necessary binder is added in midstream depending on the dispersion level in the sense that the dispersion efficiency can be improved.

The speed at which the magnetic coating material is processed by the production apparatus 10 for the magnetic coating material varies depending on the apparatus size, the concentrations of liquids, the compositions of liquids and the like, but for example, the liquid A and the solution B can be mixed at a flow rate of 500 g/minute, respectively, in the inverted Y type pipe 30 corresponding to the inlet of the ultrasonic dispersion system 16 of the production apparatus 10 for the magnetic coating material. In this case, as long as the inverted Y type pipe 30 has a structure described previously (the pipe volume of the straight part is 3 $cm^3$), the ultrasonic wave is applied when the time of 0.18 to 0.32 seconds passes (when the specific gravity of the mixture reaches 1 to 1.8 $g/cm^3$) after the liquid A and the solution B are mixed together.

Various kinds of well known methods of production may be employed for production of the magnetic recording medium by the magnetic coating material obtained by the production apparatus 10 for the magnetic coating material. For example, for the method for coating the magnetic coating material, the roller coating method, the dip coating method, the fountain coating method and the like may be employed for the application type, and the air knife coating method, the blade coating method, the bar coating method and the like may be employed for the measurement method. Also, for the method of dealing with the application type and the measurement type in the same part, the extrusion coating method, the slide bead coating method, the curtain coating method and the like may be employed.

The magnetic layer of the produced magnetic recording medium preferably has a thickness of 0.02 to 3 μm, more preferably 0.02 to 0.2 μm in dry state. Also, the layer composition is preferably such that a nonmagnetic layer having mainly a nonmagnetic powder and a binder is provided between the magnetic layer and a nonmagnetic substrate. Particularly, the composition in which the magnetic layer is a thin layer has not only an advantage that a reduction in C/N in the shortwave range is prevented to improve the medium performance but also an advantage that productivity can be improved because the level of coating seams associated with the dispersing of the coagulated magnetic material can be reduced.

The illustrative embodiment of the method for producing the magnetic recording medium according to the present invention has been described above, but the present invention is not limited to the above illustrative embodiment, and various kinds of aspects may be adopted.

For example, a batch processing type is employed as the ultrasonic dispersion apparatus 11 for liquid A in this illustrative embodiment, but a flow-type ultrasonic dispersion apparatus 40, as used in the ultrasonic dispersion system 16, may be employed.

Also, the flow-type ultrasonic dispersion apparatuses 40, 60 and 62 are employed in the ultrasonic dispersion system 16, and the sand mill dispersion apparatus 78 is employed in the sand mill dispersion system 18, but their processing order may be reversed, or the ultrasonic dispersion system may be additionally introduced after the sand mill dispersion system 18. Also, various kinds of other types of mixing devises may be employed in place of the ultrasonic dispersion apparatus 40 mixing together the liquid A and the solution B. Other types of mixing devises include such as a dissolver-type stirrer, a homomixer stirrer and a thin-layer revolving type fast stirrer (e.g. manufactured by Tokushukikako Industry Co., Ltd.).

Also, three flow-type ultrasonic dispersion apparatuses 40, 60 and 62 are placed in series in this illustrative embodiment, but only one ultrasonic dispersion apparatus having greater output may be placed, or multiple ultrasonic dispersion apparatuses each having small output may be placed.

Also, as described previously, various kinds of devices exhibiting the same effect, such as an inverted T type pipe may be employed in place of the inverted Y type pipe 30.

EXAMPLES

Examples of the present invention will now be described in contrast with Comparative Examples. In each Example described below, the expression of "parts" means "parts by weight".

Each Example described below employs a layer composition in which a nonmagnetic intermediate layer having mainly a nonmagnetic powder and a binder is provided between a magnetic layer and a nonmagnetic substrate.

In Example 1 as an Example of the present invention, a magnetic coating material prepared in such a manner that the liquid A constituted by a ferromagnetic powder and a solvent and the solution B of a binder are mixed together by applying an ultrasonic wave thereto in the ultrasonic dispersion system 16 of the production apparatus 10 for the magnetic coating material having a configuration shown in FIG. 1, and are thereafter subjected to dispersion processing is used.

On the other hand, in Example 2 as a Comparative Example, a magnetic coating material prepared in such a manner that using as a ferromagnetic powder a barium ferrite having a plate diameter of 26 nm and a plate ratio of 3, the ferromagnetic powder is made to contact a binder solution and kneaded by an open kneader to prepare a liquid, and thereafter the prepared liquid is subjected to dispersion processing in preparation of a magnetic liquid is used.

In Example 3 as a Comparative Example, a magnetic coating material prepared in such a manner that unlike Example 1 (Example of the present invention), the liquid A constituted by a ferromagnetic powder and a solvent and the solution B of a binder are stirred and mixed by a dissolver-type stirrer at a circumference speed of 18 m/second for 30 minutes and subjected to dispersion processing instead of carrying out prior ultrasonic dispersion mixing and flow-type ultrasonic dispersion processing is used.

In Example 4 as an Example of the present invention, a magnetic coating material prepared in such a manner that the liquid A constituted by a ferromagnetic powder and a solvent is subjected to dispersion processing by applying an ultrasonic wave in the ultrasonic dispersion apparatus 11 for liquid A of the production apparatus 10 for the magnetic coating material having a configuration shown in FIG. 1, and thereafter the liquid A is mixed with the solution B and subjected to dispersion processing is used.

The compositions of Examples 1 to 4 will be described below with common aspects described collectively and different aspects described individually.

(1) Compositions of Nonmagnetic Intermediate Layer (common in Examples 1 to 4)
  nonmagnetic powder α-$Fe_2O_3$: 80 parts
    average major axis length: 0.1 µm
    specific surface area based on BET method: 48 $m^2$/g
    pH 8, content of $Fe_2O_3$: 90 percents or greater
    DBP oil adsorption: 27 to 38 ml/100 g
    surface finishing agent: $Al_2O_3$
  carbon black: 20 parts
    average primary particle size: 16 µm
    DBP oil adsorption: 80 ml/100 g
    pH: 8.0
    specific surface area based on BET method: 250 $m^2$/g
    volatile component: 1.5%
  vinyl chloride copolymer: 8 parts
    MR-110 manufactured by Zeon Corporation
  polyester polyurethane resin: 4 parts
    neopentyl glycol/caprolactone polyol/MDI=0.9/2.6/1
    containing 1×10-4 eq/g of $SO_3Na$ base: Tg 65° C.
  phenylsulfone acid: 3 parts
  butyl stearate: 1 part
  stearic acid: 1 part
  methyl ethyl ketone: 150 parts
  cyclohexanone: 100 parts The coating material of the nonmagnetic intermediate layer described above was prepared by kneading components other than stearic acid and butyl stearate by an open kneader, followed by subjecting the kneaded components to dispersion processing by a pin-type sand mill dispersion apparatus of lateral circulation type (2L type) packed with small-size zirconia beads (diameter of 0.5 mm) with the bead filling factor of 80%, at a pin point circumferential speed of 12 m/second, at a flow rate of 0.5 kg/minute and with dispersion retention time of 60 minutes.

A liquid prepared by adding 3 parts of polyisocyanate to the dispersed liquid, further adding thereto 1 part of stearic acid and 1 part of butyl stearate, and dissolving them with methyl ethyl ketone and cyclohexanone (methyl ethyl ketone:cyclohexanone=36 parts:24 parts) was added and stirred to prepare a nonmagnetic coating solution with the solids content of 28% and the solvent ratio of methyl ethyl ketone:cyclohexanone=6:4. The nonmagnetic coating solution was filtered using a filter having an average pore size of 1 µm and thereby conditioned.

(2) Composition of Magnetic Layer (The magnetic liquid and the additive solution are presented. Others are not presented)
  a) Additive Paste Liquid (additive solution)(common in Examples 1 to 4)
    α-alumina (particle size 0.18 µm): 4.5 parts
    carbon black (particle size 0.10 µm): 0.5 parts
    MR 110: 0.45 parts
    Cyclohexanone: 9.2 parts The additive paste liquid had a composition of carbon black:alumina:MR 110:cyclohexanone=5:45:4.5:50.5, and this paste liquid was subjected to two-pass processing at a flow rate of 30 g/minute, apart from the magnetic material, using a flow-type ultrasonic dispersion apparatus (1200 W, the frequency was 20 kHz, the diameter of the surface of the irradiation part was 50 mm, the space between the irradiation part and the holder was 3 mm, the amplitude was 30 µm).

b) Magnetic Liquid (different among Examples 1 to 4)

Example 1

Ferromagnetic powder: 100 parts
  plate diameter: 26 nm
  plate ratio: 3
  average primary particle volume: 3805 $nm^3$
  SBET: 60 $m^2$/g
  pH: 7.9
  Hc: 187856 A/m (2360 Oe)
  σs: 49 A·$m^2$/kg
  true specific gravity: 5.1 g/ml
  apparent specific gravity: 0.7 g/ml
MR 110: 10 parts
methyl ethyl ketone: 20 parts
cyclohexanone: 170 parts For preparation of the magnetic coating solution of the Example, the components were blended so that the liquid A had a composition of ferromagnetic powder:cyclohexanone =100 parts:150 parts. As pre-stirring, 100 g of liquid A (mixture) was put in a cylindrical container with the inner diameter of 50 mm (flat bottom, thickness 2 mm, made of glass, height 100 mm, cappedtype), and the cylindrical container containing the mixture was placed in an ultrasonic cleaner Model: BRANSONIC 220 manufactured by BRANSON Co., Ltd. (specifications: 125W, the diameter of irradiation surface of 50 mm and two oscillation parts, frequency 40 kHz) with water introduced therein to process the liquid A.

The cylindrical container was placed just above the oscillation part of the ultrasonic cleaner, and ultrasonic processing was carried out with in one minute after immersion in a solvent (mixing). The amount of ultrasonic processing time was 30 minutes. Thereafter, it was put in the liquid tank 21 of the liquid A supplying system 12 of the production apparatus 10 for the magnetic coating material shown in FIG. 1, and was stirred by the stirrer 22 and then left standing.

Independently, as the solution B, a binder solution of MR110:cyclohexanone:methyl ethyl ketone=10:20:20 (solids content in liquid was 20%) prepared by the dissolver-type stirrer was put in the liquid tank 25 of the solution B supplying system 14 of the production apparatus 10 for the magnetic coating material shown in FIG. 1, and was stirred by the stirrer 26 and then left standing.

The mixing of the liquid A and the solution B was carried out by applying an ultrasonic wave thereto after the liquid A was merged with the solution B by the inverted Y type pipe 30. In the ultrasonic dispersion system 16, the previously described Flow-type Ultrasonic Dispersion Apparatus (trade name: US-1200TCVP) manufactured by Nihon Seiki Co., Ltd. (specifications are not shown) was used as the flow-type ultrasonic dispersion apparatuses 40, 60 and 62.

The inflow rates of the liquid A and the solution B into the inverted Y type pipe 30 were each 500 g/minute to carry out the mixing. The mixture leaving the ultrasonic dispersion apparatus 40 was further passed through the ultrasonic dispersion apparatuses 60 and 62 coupled in series.

Then, in the sand mill dispersion system 18, the mixture was processed by a pin-type sand mill dispersion apparatus 78 of lateral circulation type (2L type). For the processing conditions, dispersion processing was carried out at a pin point circumferential speed of 10 m/second, at a flow rate of 0.5 kg/minute and with dispersion retention time of 30 minutes, with the dispersion apparatus packed with small-size zirconia beads (diameter of 0.5 mm) with the bead filling factor of 80%.

Example 2

As Comparative Example, using as a ferromagnetic powder a barium ferrite having a plate diameter of 26 nm and a plate ratio of 3, the ferromagnetic powder was made to contact a binder solution kneaded by an open kneader to prepare a liquid, and thereafter the prepared liquid was subjected to dispersion processing in preparation of a magnetic liquid. The proportion of the ferromagnetic powder was same as that of Example 1.

More specifically, the ferromagnetic powder, the binder, methyl ethyl ketone and cyclohexanone were kneaded by the open kneader, followed by subjecting the kneaded components to dispersion processing by a pin-type sand mill dispersion apparatus of lateral circulation type (2L type) packed with small-size zirconia beads (diameter of 0.5 mm) with the bead filling factor of 80%, at a pin point circumferential speed of 10 m/second, at a flow rate of 0.5 kg/minute and with dispersion retention time of 30 minutes.

Example 3

As Comparative Example, the liquid A constituted by a ferromagnetic powder and a solvent and the solution B of a binder were stirred and mixed by a dissolver-type stirrer at a circumference speed of 18 m/second for 30 minutes and subjected to dispersion processing, instead of carrying out prior ultrasonic dispersion mixing and flow-type ultrasonic dispersion processing. The proportion of the ferromagnetic powder was same as that of Example 1.

Example 4

The proportions of the ferromagnetic powder, MR110, methyl ethyl ketone and cyclohexanone were same as those of Example 1.

For preparation of the magnetic coating material of the example, components were blended so that the liquid A had a composition of ferromagnetic powder:cyclohexanone=1000 parts:150 parts. Conditions of pre-stirring were same as those of Example 1.

Independently, as the solution B, a binder solution of MR110:cyclohexanone:methyl ethyl ketone=10:20:20 (the solid content in liquid is 20%) was prepared in advance.

For the mixing of the liquid A and the solution B, they were stirred and mixed by the dissolver-type stirrer at a circumferential speed of 18 m/second for 30 minutes and subjected to dispersion processing.

Thereafter, this mixture was processed by a pin-type sand mill dispersion apparatus 78 of lateral circulation type (2L type) in the sand mill dispersion system 18. For the processing conditions, dispersion processing was carried out at a pin point circumferential speed of 10 m/second, a flow rate of 0.5 kg/minute and with the dispersion retention time of 30 minutes, with the dispersion apparatus packed with small-size zirconia beads (diameter of 0.5 mm) with the bead filling factor of 80%.

The step of mixing the magnetic liquid of the Examples 1 to 4 and the previously described additive paste liquid to prepare a magnetic coating material in the magnetic coating solution preparing system 20 shown in FIG. 1 will now be described.

The magnetic coating solution and the additive paste liquid were put in the liquid tank 82 of the magnetic coating solution preparing system 20, and was mixed and stirred by the stirrer 84, and a solution with 0.5 parts of stearic acid and 1.5 parts of butyl stearate dissolved by 50 parts of methyl ethyl ketone and 30 parts of cyclohexanone was added and stirred to prepare a magnetic coating (magnetic coating material). The magnetic coating solution was filtered by the filter 88 having an average pore size of 1 µm and thereby conditioned.

A magnetic tape as the magnetic recording medium was produced in the following step. As a nonmagnetic substrate, polyester naphthalate of which the roughness component strength was 0.03 nm$^2$ with the thickness of 5.2 µm and the wavelength of 4.3 µm in the roughness spectral of AFM was used.

Simultaneous double layer coatings were provided on the substrate so that the post-dry thickness of the nonmagnetic layer coating solution was 1.5 µm, and immediately thereafter, a magnetic layer with the post-dry thickness of 0.1 µm was formed thereon. When both the nonmagnetic layer and magnetic layer were still wetted, they were oriented by a cobalt magnet having a magnetic force of 3000G and a solenoid having a magnetic force of 1500G and thereby dried, and were thereafter processed at a temperature of 85°

C., under a linear pressure of 350 kg/cm and at a speed of 50 m/minute by a seven-stage calendar apparatus composed only of a metal roll, and the substrate was slit into a width of 6.35 mm, thereby producing a magnetic tape.

The magnetic tapes of the Examples 1 to 4 were evaluated for the following two items. That is, the items are the number of masses and the cluster size.

The number of masses was examined by counting the number of flecked masses per predetermined area using an optical microscope. Numbers of masses equivalent to 8 visual fields in the 500 times visual field were summed to determine the number of masses. The area equivalent to 8 visual fields in the 500 times visual field corresponds to 0.1768 mm$^2$.

In Example 1 (Example of the present invention), the number of masses was 0 and the number of masses was 1 in Example 4 (Example of the present invention). On the other hand, the numbers of masses were 140 and 40 in Examples 2 and 3 as Comparative Examples, respectively.

The cluster size was measured by MFM (magnetic force microscope). In Example 1 (Example of the present invention), the cluster size was 5,800 nm$^2$ and the cluster size was 10,000 nm$^2$ in Example 4 (Example of the present invention). On the other hand, in Examples 2 and 3 as Comparative Examples 2 and 3, the cluster sizes were 29,000 nm$^2$ and 17,000 nm$^2$ respectively.

If compared the Example of the present invention with Comparative Examples, it can be understood that in Examples 1, 4 (Example of the present invention), the number of coagulated flecked masses when observing the surface of the magnetic layer by the optical microscope is small and the magnetized cluster size by MFM is small compared to Example 2 (Comparative Example), and therefore the effect of the present invention can be ascertained.

It can be understood that in Example 3 (Comparative Example), the number of masses is small and the magnetized cluster size by MFM is also small compared to Example 2 (Comparative Example), but it can also be understood that Example 3 is apparently inferior to the Example of the present invention.

As described above, according to the present invention, the liquid A constituted by a ferromagnetic powder and a solvent and the solution B of a binder can be mixed together by applying the ultrasonic wave thereto, thus making it possible to obtain a ferromagnetic powder solution in which coagulated particles of the ferromagnetic powder can be dispersed, the ferromagnetic powder can be prevented from coagulating, and the binder is uniformly adsorbed. Consequently, a magnetic coating material suitable for a low-noise high-density coating-type magnetic recording medium can be obtained.

Also, according to the present invention, since the liquid A constituted by a ferromagnetic powder and a solvent is subjected to dispersion processing by applying an ultrasonic wave thereto, and is thereafter mixed with the solution B, coagulated particles of the ferromagnetic powder can be dispersed, and the coagulation of the ferromagnetic powder can be prevented, thereby making it possible to obtain a solution of ferromagnetic powder in which a binder is uniformly adsorbed. Consequently, a magnetic coating material suitable for a low-nose high density coating-type magnetic recording medium can be obtained.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for producing a magnetic recording medium having a nonmagnetic substrate coated with a magnetic coating material containing a ferromagnetic powder and a binder, comprising:
   preparing a liquid A constituted by a ferromagnetic powder and a solvent;
   preparing a solution B of a binder;
   mixing the liquid A and the solution B together in a liquid-liquid state by applying an ultrasonic wave thereto, and thereafter subjecting the mixture to dispersion processing to obtain a magnetic coating material to achieve the binder uniformly absorbed on the surface of the substrate; and
   coating a nonmagnetic substrate with the magnetic coating material whereby a lower noise and higher density coating is achieved by reducing secondary coagulation as compared to initial contact of binder and ferromagnetic material powder in a mixer.

2. The method as defined in claim 1, wherein the ultrasonic wave is applied within one second after the liquid A and the solution B are mixed together.

3. The method as defined in claim 1, wherein the liquid A is subjected to dispersion processing by applying the ultrasonic wave thereto before the liquid A and the solution B are mixed together.

4. The method as defined in claim 1, wherein the ferromagnetic powder is a needle particle with a major axis length of 10 to 100 nm.

5. The method as defined in claim 1, wherein the ferromagnetic powder is a plate particle with a plate diameter of 10 to 50 nm.

6. A method for producing a magnetic recording medium having a nonmagnetic substrate coated with a magnetic coating material containing a ferromagnetic powder and a binder, comprising:
   preparing a liquid A constituted by a ferromagnetic powder and a solvent;
   preparing a solution B of a binder;
   subjecting the liquid A to dispersion processing by applying an ultrasonic wave thereto, and thereafter mixing the liquid A and the solution B together in a liquid-liquid state to obtain a magnetic coating material to achieve the binder uniformly absorbed on the surface of the substrate; and
   coating a non-magnetic substrate with the magnetic coating material whereby a lower noise and higher density coating is achieve by reducing secondary coagulation as compared to initial contact of binder and ferromagnetic material powder in a mixer.

7. The method as defined in claim 6, wherein the ferromagnetic powder is a needle particle with a major axis length of 10 to 100 nm.

8. The method as defined in claim 6, wherein the ferromagnetic powder is a plate particle with a plate diameter of 10 to 50 nm.

* * * * *